US010726016B2

(12) United States Patent
Chavan et al.

(10) Patent No.: US 10,726,016 B2
(45) Date of Patent: Jul. 28, 2020

(54) IN-MEMORY COLUMN-LEVEL MULTI-VERSIONED GLOBAL DICTIONARY FOR IN-MEMORY DATABASES

(71) Applicant: Oracle International Corporation, Redwood Shores, CA (US)

(72) Inventors: Shasank K. Chavan, Menlo Park, CA (US); Prashant Gaharwar, San Mateo, CA (US); Ajit Mylavarapu, Mountain View, CA (US); Dina Thomas, Palo Alto, CA (US); Dennis Lui, San Jose, CA (US); Sheldon A. K. Lewis, Jalisco (MX); Roger D. Macnicol, Hummelstown, PA (US)

(73) Assignee: Oracle International Corporation, Redwood Shores, CA (US)

( * ) Notice: Subject to any disclaimer, the term of this patent is extended or adjusted under 35 U.S.C. 154(b) by 732 days.

(21) Appl. No.: 15/294,460

(22) Filed: Oct. 14, 2016

(65) Prior Publication Data

US 2017/0109406 A1   Apr. 20, 2017

Related U.S. Application Data

(60) Provisional application No. 62/242,119, filed on Oct. 15, 2015, provisional application No. 62/245,952, (Continued)

(51) Int. Cl.
*G06F 16/2455* (2019.01)
*G06F 16/22* (2019.01)
*G06F 16/33* (2019.01)

(52) U.S. Cl.
CPC ...... *G06F 16/24561* (2019.01); *G06F 16/221* (2019.01); *G06F 16/3347* (2019.01)

(58) Field of Classification Search
None
See application file for complete search history.

(56) References Cited

U.S. PATENT DOCUMENTS 8,825,678 B2   9/2014   Potapov
9,251,210 B2   2/2016   Chaudhry et al.
(Continued)

OTHER PUBLICATIONS

Amazon, Database Developer Guide, Dec. 1, 2012 (Year: 2012).*
(Continued)

*Primary Examiner* — Usmaan Saeed
*Assistant Examiner* — Yu Zhao
(74) *Attorney, Agent, or Firm* — Hickman Palermo Becker Bingham LLP

(57) ABSTRACT

Techniques are described herein for sharing a dictionary across multiple in-memory compression units (IMCUs). After a dictionary is used to encode a first column vector in a first IMCU, the same dictionary is used to encode a second column vector in a second IMCU. The entries in the dictionary are in sort order to facilitate binary searching when performing value-to-code look-ups. If, during the encoding of the second column vector, values are encountered for which the dictionary does not already have codes, then a "sort-order-boundary" is established after the last entry in the dictionary, and entries for the newly encountered values are added to the dictionary, after the sort-order-boundary. To facilitate value-to-code look-ups, the new entries are also sorted relative to each other, creating a second "sort order set". A new version of the dictionary may be created when the number of sort order sets in the first version of the dictionary reaches a configurable threshold.

15 Claims, 6 Drawing Sheets

Related U.S. Application Data filed on Oct. 23, 2015, provisional application No. 62/245,948, filed on Oct. 23, 2015, provisional application No. 62/393,780, filed on Sep. 13, 2016.

(56) References Cited

U.S. PATENT DOCUMENTS

| | | |
|---|---|---|
| 9,916,352 B2 | 3/2018 | Chaudhry et al. |
| 2001/0000536 A1* | 4/2001 | Tarin .................... G06F 16/283 |
| 2003/0028509 A1* | 2/2003 | Sah ....................... G06F 16/284 |
| 2003/0088537 A1* | 5/2003 | Ko ....................... H03M 7/3088 |
| 2003/0187858 A1 | 10/2003 | Kirk |
| 2010/0049730 A1 | 2/2010 | Qiaq |
| 2010/0299367 A1 | 11/2010 | Chakrabarti |
| 2010/0328115 A1 | 12/2010 | Binnig |
| 2012/0117064 A1* | 5/2012 | Draese ................. G06F 16/283 707/737 |
| 2013/0103654 A1* | 4/2013 | McLachlan ............ G06F 16/23 707/692 |
| 2013/0232176 A1* | 9/2013 | Plattner .................. G06F 16/20 707/803 |
| 2013/0275364 A1 | 10/2013 | Wang |
| 2014/0122452 A1* | 5/2014 | Faerber ............ G06F 16/24561 707/693 |
| 2015/0052150 A1 | 2/2015 | Sharique |
| 2015/0178305 A1* | 6/2015 | Mueller ............... G06F 16/221 707/693 |
| 2015/0324373 A1* | 11/2015 | Tyercha .............. G06F 16/2458 707/722 |
| 2016/0147833 A1 | 5/2016 | Chaudhry et al. |
| 2016/0196302 A1 | 7/2016 | Beavin |
| 2017/0024435 A1 | 1/2017 | Koclubes et al. |
| 2019/0102412 A1 | 4/2019 | Macnicol et al. |
| 2020/0125572 A1 | 4/2020 | Hanckel |

OTHER PUBLICATIONS

Bernet, "Dictionary compression for a scan-based, main-memory database system," 2010 (Year: 2010).*

Oracle, Oracle Database In-Memory, Aug. 2014, (Year: 2014).*

Kociubes, U.S. Appl. No. 14/806,576, filed Jul. 22, 2015, Notice of Allowance, dated Apr. 11, 2018.

Kociubes U.S. Appl. No. 14/806,576, filed Jul. 22, 2015, Interview Summary, dated Feb. 14, 2018.

KD Nuggets, "Apache Arrow and Apache Parquet: Why We Needed Different Projects for Columnar Data, On Disk and In-Memory", www.kdnuggets.com/2017/02/apache-arrow-parquet-columnar-data, Feb. 2017, 8pgs.

Chavan, U.S. Appl. No. 15/602,009, filed May 22, 2017, Dec. 11, 2019.

Chavan, U.S. Appl. No. 15/397,714, filed Jan. 3, 2017, Office Action, dated Nov. 29, 2019.

* cited by examiner

FIG. 1

TABLE 100

| STATE | REGION |
|---|---|
| CA | 1 |
| WI | 7 |
| WI | 7 |
| IL | 3 |
| CA | 1 |
| NV | 1 |
| CA | 1 |
| ... | ... |

COLUMN VECTOR 102

| |
|---|
| CA |
| WI |
| WI |
| IL |
| CA |
| NV |
| CA |

ENCODED COLUMN VECTOR 104

| |
|---|
| 1 |
| 4 |
| 4 |
| 2 |
| 1 |
| 3 |
| 1 |

DICTIONARY 106a

| CODE | STATE |
|---|---|
| 1 | CA |
| 2 | IL |
| 3 | NV |
| 4 | WI |

IN VOLATILE MEMORY

DICTIONARY 106b

| CODE | STATE |
|------|-------|
| 1 | CA |
| 2 | IL |
| 3 | NV |
| 4 | WI |
| 5 | AK |
| 6 | GA |

SORT ORDER BOUNDARY 116

ENCODED COLUMN VECTOR 104

| |
|---|
| 1 |
| 4 |
| 4 |
| 2 |
| 1 |
| 3 |
| 1 |

IMCU 202

ENCODED COLUMN VECTOR 206

| |
|---|
| 1 |
| 4 |
| 4 |
| 2 |
| 1 |
| 3 |
| 1 |

IMCU 204

ON PERSISTENT STORAGE

TABLE 100

| STATE | REGION |
|-------|--------|
| CA | 1 |
| WI | 7 |
| WI | 7 |
| IL | 3 |
| CA | 1 |
| NV | 1 |
| CA | 1 |
| GA | 3 |
| NV | 6 |
| AK | 3 |
| CA | 5 |
| NV | 1 |
| ... | 3 |

DICTIONARY 106c

| | CODE | STATE |
|---|---|---|
| SORT ORDER BOUNDARY 116 | 1 | CA |
| | 2 | IL |
| | 3 | NV |
| | 4 | WI |
| S.O. BOUNDARY 302 | 5 | AK |
| | 6 | GA |
| | 7 | AL |
| S.O. BOUNDARY 304 | 8 | AR |
| | 9 | CO |
| | 10 | MT |
| | 11 | NH |
| | 12 | NJ |
| S.O. BOUNDARY 306 | 13 | SD |
| | 14 | TX |
| | 15 | CT |
| | 16 | DE |
| | 17 | HI |
| S.O. BOUNDARY 308 | 18 | KS |
| | 19 | WV |
| | 20 | MN |
| | 21 | OH |
| | 22 | WY |

FIG. 3

VERSION 1
DICTIONARY 106c

| CODE | STATE |
|---|---|
| 1 | CA |
| 2 | IL |
| 3 | NV |
| 4 | WI |
| 5 | AK |
| 6 | GA |
| 7 | AL |
| 8 | AR |
| 9 | CO |
| 10 | MT |
| 11 | NH |
| 12 | NJ |
| 13 | SD |
| 14 | TX |
| 15 | CT |
| 16 | DE |
| 17 | HI |
| 18 | KS |
| 19 | WV |
| 20 | MN |
| 21 | OH |
| 22 | WY |

116
302
304
306
308

VERSION 2
DICTIONARY 106d

| CODE | STATE |
|---|---|
| 1 | AK |
| 2 | AL |
| 3 | AR |
| 4 | CA |
| 5 | CO |
| 6 | CT |
| 7 | DE |
| 8 | GA |
| 9 | HI |
| 10 | IL |
| 11 | KS |
| 12 | MN |
| 13 | MT |
| 14 | NH |
| 15 | NJ |
| 16 | NV |
| 17 | OH |
| 18 | SD |
| 19 | TX |
| 20 | WI |
| 21 | WV |
| 22 | WY |

FIG. 4

IN-MEMORY COLUMN-LEVEL MULTI-VERSIONED GLOBAL DICTIONARY FOR IN-MEMORY DATABASES

CROSS-REFERENCE TO RELATED APPLICATIONS; BENEFIT CLAIM

This application claims the benefit of:
Provisional Appln. 62/242,119, filed Oct. 15, 2015,
Provisional Appln. 62/245,952, filed Oct. 23, 2015,
Provisional Appln. 62/245,948, filed Oct. 23, 2015, and
Provisional Appln. 62/393,780, filed Sep. 13, 2016
the entire contents of each of which are hereby incorporated by reference as if fully set forth herein, under 35 U.S.C. § 119(e).

FIELD OF THE INVENTION

The present invention relates to dictionary encoding and, more specifically, to encoding multiple column vectors using the same dictionary, appending sort order sets to shared dictionaries, and creating new versions of shared dictionaries when the number of sort order sets in the current version of a shared dictionary reaches a threshold.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be preloaded into volatile memory. Various approaches for loading entire database objects, or selected portions thereof, into volatile memory to speed up database operation processing are described in U.S. Pat. No. 9,292,564, entitled "Mirroring, In Memory, Data From Disk To Improve Database operation Performance", the application for which was filed Jul. 21, 2014, referred to herein as the "Mirroring" application, the contents of which are incorporated herein in their entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. The format used by the on-disk copies is referred to as the "persistent format", while the format used by the in-memory copies is referred to as the "mirror format". An in-memory version or copy of an object (or selected portions thereof), is referred to herein as an In-Memory Columnar Unit (IMCU).

To reduce the amount of volatile memory consumed by IMCUs, the mirror format is often compressed. One way to compress an IMCU is through the use of dictionary encoding. For example, assume that an IMCU stores a contiguous array of values from a column c1 of a table T1. Such an array is referred to herein as a "column vector". To reduce the volatile memory required to store such a column vector, the actual values from the table may, within the column vector, be replaced with values that take less space ("codes"). For example, a character string of 30 characters may be replaced by a four-byte code. The column vector produced by making such replacements is significantly smaller than a column vector that contains the original values.

While dictionary encoding significantly reduces the size of column vectors, it is necessary, when processing database commands based on information from the column vectors, to be able to reproduce the actual values of the column. Therefore, a dictionary is maintained in conjunction with a column vector. The dictionary associated with a column vector contains a replacement-value-to-actual-value mapping for each unique value in the original set of values. For example, assume that column c1 stores the names of states, and that table T1 has one million rows. The dictionary for the compressed column vector for c1 would have one entry for each unique state name that is present in c1. Since there are only 50 states, the dictionary for the compressed column vector for c1 would have at most 50 entries.

The process of encoding a column vector typically involves (a) reading the actual values from the target column, (b) eliminating duplicates to create a list of unique values, (c) and (d) assigning a code to each unique value. Once a code has been assigned to each unique value, the values within a column vector are replaced with the corresponding codes. Because the codes are smaller than the values the codes replace, the column vectors that contain the codes are effectively "compressed".

Decompressing a compressed column is referred to as "materializing" the column. Decompressing a column vector that was compressed using dictionary encoding involves performing code-to-value look-ups using the dictionary by which the column vector was encoded. To speed up code-to-value look-up operations, the position of the unique value's entry in the dictionary may be treated as the code for that unique value. For example, the value associated with the first dictionary entry may be assigned a code of "1", the value associated with the second dictionary entry may be assigned a code of "2", etc. To illustrate how assigning codes that correspond to the entry positions within the dictionary reduces the time required for code-to-value look-up operations, assume that the database server needs to determine the value that corresponds to the code "7". To determine the value, the database server can simply use "7" as an index into the dictionary to locate the seventh dictionary entry. The 7th dictionary entry contains the actual value, from c1, that corresponds to the code "7".

To speed up value-to-code look-up operations, the values are stored in the dictionary in sorted order. By storing the values in the dictionary in sorted order, the code for a target value may be ascertained by performing a binary search on the dictionary. Upon finding the target value within an entry in the dictionary, the database server simply uses the position, within the dictionary, of the entry that has the target value, as the code for the target value. Thus, if the binary search finds target value in the $7^{th}$ entry of the dictionary, then the code for the target value is "7".

Unfortunately, it is often impractical to have a single column vector for a column. For example, if column c1 has several million rows, even the compressed column vector for the column may be too large to be efficiently stored in a single IMCU. Therefore, it is common for one column of a table to be divided up into multiple column vectors, each of which covers a range of rows from the actual table. For example, assume that column c1 has 3000 rows. Column c1 may be mirrored in volatile memory using three column vectors CV1, CV2 and CV3, where CV1 covers the values of c1 from row 1 to row 1000, CV2 covers values of c1 from row 1001 to row 2000, and CV3 covers values of c1 from row 2001 to row 3000. Each of these column vectors may be stored, within the volatile memory of the same node, in separate IMCUs. For the purpose of explanation, it shall be assumed that the IMCUs to which column vectors CV1, CV2 and CV3 belong are IMCU1, IMCU2, and IMCU3, respectively.

In the scenario described above, because each of column vectors CV1, CV2 and CV3 is in a separate IMCU, each of column vectors would be encoded using a different dictionary. For the purpose of explanation, the dictionary used to encode column vectors CV1, CV2 and CV3 shall be referred to as DCT1, DCT2 and DCT3, respectively. DCT1, DCT2, and DCT3 are IMCU-specific. Specifically, the dictionaries are not interchangeable because, for example, column c1 of rows 1-1000 (CV1) may have some values that column c1 of rows 1001-2000 (CV2) does not have, and visa-versa. Thus, DCT1 would have entries for values for which DCT2 would not have entries, and visa-versa. Further, even for the values that are common to both CV1 and CV2, the codes to which those common values are mapped may be different. For example, DCT1 may map "California" to code "2", while DCT2 maps "California" to code "4".

Often, database commands require processing all rows of a table based on values in a specified column, not simply those rows that belong to a single column vector. For example, a query may have the predicate "where c1='California' or 'Maine'". When processing such commands, the database server creates various temporary data structures based on the mappings in DCT1 to apply the predicate "where c1='California' or 'Maine'" to the values in CV1. Then, those temporary data structures are discarded, and new temporary data structures are created based on the mappings in DCT2 to apply the predicate "where c1='California' or 'Maine'" to values in CV2. Finally, those temporary data structures are discarded, and new temporary data structures are created based on the mappings in DCT3 to apply the predicate "where c1='California' or 'Maine'" to values in CV3.

Not only is the rebuilding of those temporary data structures time consuming, but the dictionaries themselves may be highly redundant. For example, DCT1, DCT2 and DCT3 may each have entries for all or nearly all of the 50 states. The redundant storage of the same values (which can be quite large) in multiple dictionaries can consume a significant amount of volatile memory. For example, a significant amount of memory would be consumed by five IMCU-specific dictionaries, where each of the five IMCU-specific dictionaries established a different mapping for nearly the same set of one million large unique values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram showing a dictionary encoded column vector;

FIG. 2 is a block diagram showing a global dictionary, containing two sort order sets, used to encode multiple column vectors, according to an embodiment;

FIG. 3 is a block diagram showing a global dictionary with several sort order sets, according to an embodiment;

FIG. 4 is a block diagram showing multiple versions of a global dictionary, each of which may be used to encode multiple column vectors, according to an embodiment;

DETAILED DESCRIPTION

Figure 5:
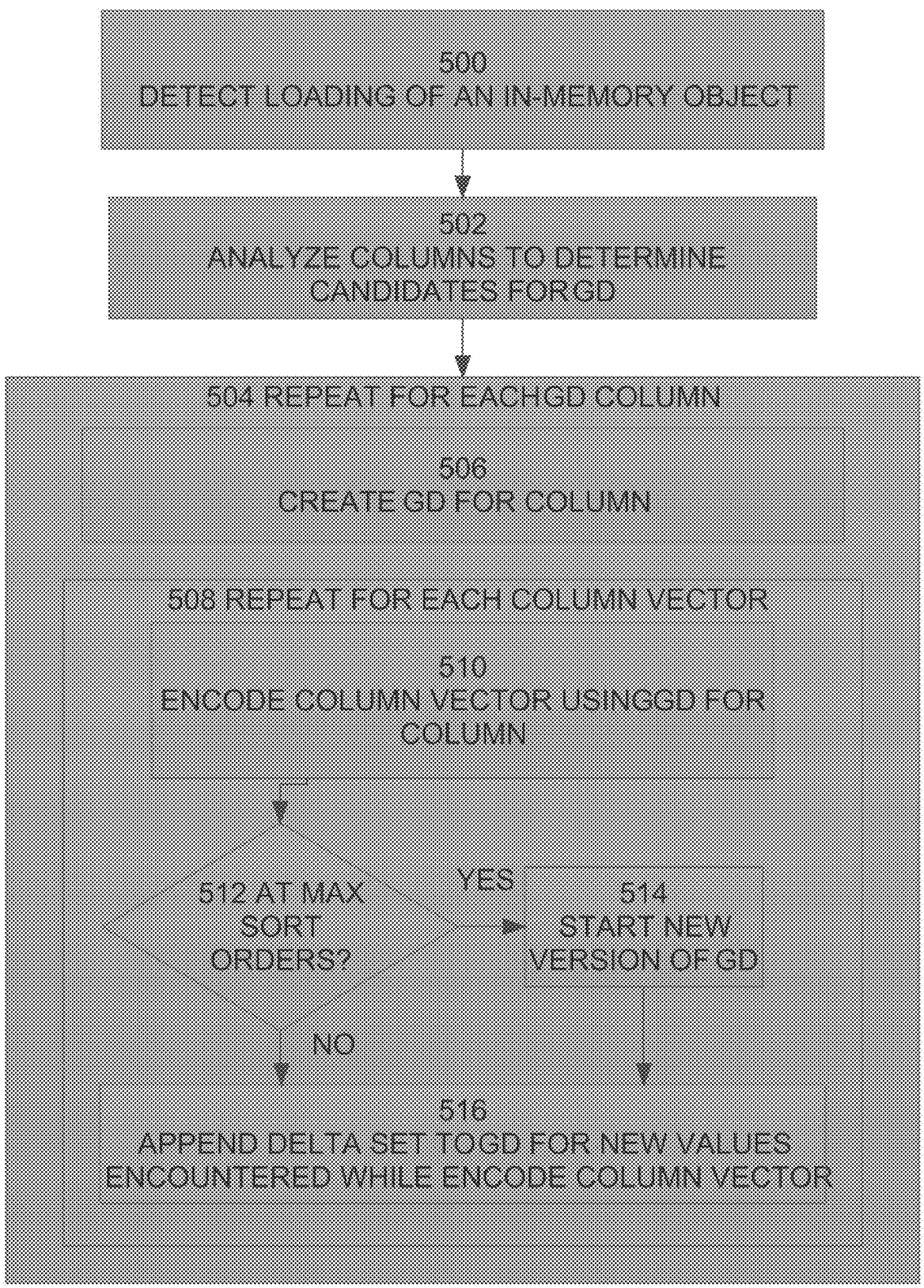
FIG. 5 is a flowchart illustrating steps of creating an in-memory copy of a column, where the in-memory copy is stored in multiple column vectors that are encoded using a versioned global dictionary, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for sharing a dictionary across multiple IMCUs. According to one embodiment, after a dictionary is used to encode a first column vector in a first IMCU, the same dictionary is used to encode a second column vector in a second IMCU. As mentioned above, the entries in the dictionary are in sort order to facilitate binary searching when performing value-to-code look-ups. If, during the encoding of the second column vector, values are encountered for which the dictionary does not already have codes, then a "sort-order-boundary" is established after the last entry in the dictionary, and entries for the newly encountered values are added to the dictionary after the sort-order-boundary. To facilitate value-to-code look-ups, the new entries are also sorted relative to each other. Consequently, after the new entries are added, performing a value-to-code look-up for a target value involves (a) performing a binary search among the original entries and, if an entry for the target value is not found among the original entries, then (b) performing a binary search among the new entries.

The same dictionary may then be used to encode additional column vectors. Any column vector that has one or more new values to add to the dictionary establishes an additional sort-order-boundary, and adds new entries after the new sort-order-boundary. Because each sort-order-boundary means that an additional binary search may need to be performed during value-to-code look-ups, it may be desirable to establish a maximum number of sort-order-boundaries a dictionary may have.

Once a dictionary has reached the maximum number of sort-order-boundaries, newly-encountered values cause a new version of the dictionary to be created. In the new version of the dictionary, all entries are sorted relative to each other, so each value-to-code look-up using the new version of the dictionary initially requires a single binary search. Once a new version of a dictionary is created, subsequent column vector encoding operations use the new version (until it also reaches the maximum number of sort order boundaries). The newest version of a dictionary is also used when column vectors are encoded during all IMCU refresh operations, when IMCUs are repopulated with current data.

By using a single dictionary to encode the column vectors of multiple IMCUs, the redundant storage of values within dictionaries is reduced. For example, a single dictionary with one million unique values may be used for five IMCUs, rather than each of the five IMCUs having its own dictionary of one million values. In addition, the temporary data structures that are created based on the single shared dictionary may be used to evaluate a predicate against the values from multiple IMCUs. Such temporary data structures may include, for example, an inverted index on symbols to their location in specific column vectors to quickly prune column vectors without that symbol, or a bloom filter on the global dictionary to quickly tell if a symbol is not present at all. Thus, the need to discard such structures every time a predicate needs to be applied to values from a different IMCU is avoided.

Database Systems

Embodiments of the present invention are used in the context of database management systems (DBMSs). Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Example Encoded Column Vector

Referring to FIG. 1, it illustrates a table 100 that shall be referred to hereafter for the purpose of explanation. Table 100 includes two columns, a "state" column and a "region" column. Column vector 102 is a column vector containing values from the first seven rows of the "state" column of table 100. Encoded column vector 104 is a compressed version of column vector 102. Specifically, encoded column vector 104 is a compressed column vector formed by replacing the state names in column vector 102 with smaller codes. The code-to-name mappings used to create the encoded column vector 104 are shown in dictionary 106a.

Dictionary 106a is illustrated as having two columns, a code column and a state column. However, in practice, the code column may be implicit. Specifically, the code for an entry in dictionary 106a is implicitly indicated by the position of the entry within dictionary 106a. Thus, the state name in the first entry of dictionary 106a implicitly maps to 1, the state name in the second entry of dictionary 106a implicitly maps to 2, etc.

As mentioned above, using codes that correspond to entry positions within dictionary 106a allows for highly-efficient code-to-value look-ups. Specifically, given any code, the dictionary entry for the code can be immediately located by using the code as an index into the dictionary.

It should be noted that, within dictionary 106a, the state names are stored in sorted order. As explained above, storing the values in sorted order improves the efficiency of value-to-code look-ups because the ordering of the values enables binary searches to be performed to locate values in dictionary 106a. Once a target state name is found using a binary search, the code for the state name is determined by the position, within dictionary 106a, of the entry containing the state name.

Global Dictionary

FIG. 2 is a block diagram that illustrates how dictionary 106b may be shared between IMCUs as a global dictionary, according to one embodiment. Referring to FIG. 2, it illustrates a scenario in which encoded column vector 104 has been stored in an IMCU 202 within volatile memory of a computing device (not shown). Dictionary 106b is also stored in the volatile memory to enable fast code-to-value lookups and value-to-code lookups.

As explained above, encoded column vector 104 only encodes values of the "state" column for the first seven rows 212 of table 100. The next seven rows 214 are encoded in another encoded column vector 206 which is stored in a different IMCU 204. In practice, the numbers of rows reflected in any column vector would typically be significantly more than seven, and could reach to the millions. Thus, the examples given herein are solely for the purpose of illustration, and do not in any way limit the application of the techniques.

As illustrated in FIG. 2, dictionary 106b is "shared" between IMCUs 202 and 204 in that dictionary 106b is used to encode values from rows 212 to produce encoded column vector 104 of IMCU 202 and to encode values from rows 214 to produce encoded column vector 206 of IMCU 204. However, during the encoding of rows 214, the database server encountered two values ("GA" and "AK") for which dictionary 106a did not have codes. In response, the database server established a sort order boundary 116 within dictionary 106b, and appended two entries to dictionary 106b after the sort order boundary 116. The values in all entries within dictionary 106b prior to sort order boundary 116 are sorted relative to each other, and the values in all entries after sort order boundary 116 are sorted relative to each other, but the values before sort order boundary 116 are not sorted relative to the entries after sort order boundary 116.

By using dictionary 106b to encode the values from rows 214, rather than create a new dictionary for encoding rows 214, the database server reduces the amount of memory used to store the mappings needed to decode encoded column vectors. For example, if an entirely new dictionary were created to encode the values from rows 214, then that dictionary would, similar to dictionary 106b, have four entries (because rows 214 contain four unique state names). Two dictionaries with four entries would consume more space than one dictionary with six entries (dictionary 106b in FIG. 2). The space saving is even greater the more values a column vector has with other column vectors that share the same dictionary.

In addition to saving memory by having a consolidated shared dictionary, the fact that dictionary 106b is shared also increases the performance of database operations that make use of encoded column vectors 104 and 206. For example, the temporary data structures that are created based on dictionary 106b during the evaluation of a predicate against values from encoded column vector 104 can be continued to be used during the processing of the same predicate against values from encoded column vector 206. Thus, the need to discard and recreate such data structures when switching between operations on one encoded column vector to another is eliminated.

Sort Order Sets

A contiguous set of dictionary entries that are sorted relative to each other are referred to herein as a "sort order set". As illustrated in FIG. 1, dictionary 106a has a single sort order set. As illustrated in FIG. 2, dictionary 106b has two sort order sets, where the first sort order set is separated from the second sort order set by a sort order boundary.

The number of sort order sets within a global dictionary directly affects the performance of value-to-code look ups using the dictionary. For example, to determine the code for "GA" using dictionary 106b as illustrated in FIG. 2, the database server performs a binary search on the entries in the sort order set above sort order boundary 116, and (if "GA" is not found) a second binary search on the entries in the sort order set below sort order boundary 116. While such searches are trivial in situations where, as illustrated, the number of entries is low, such searches can consume a significant amount of time when the number of entries is high (e.g. in the millions).

A global dictionary can be shared across any number of column vectors. However, each time the dictionary is used to encode a column vector that contains any values for which the dictionary does not already have entries, a new sort order boundary is added to the dictionary, and new entries for those values are appended to the dictionary after the new sort order boundary. Those entries, which are for values that are sorted relative to each other, are not sorted relative to the rest of the dictionary, and therefore constitute a new sort order set. Thus, a global dictionary used to encode N column vectors can have up to N sort order sets, and therefore require up to N binary searches for ever value-to-code look up.

Referring to FIG. 3, it is a block diagram that illustrates dictionary 106c after dictionary 106c has been used to encode 8 column vectors. For the purpose of discussion, column vector 104 shall be referred to as CV1, and column vector 206 shall be referred to as CV2. The other six column vectors that dictionary 106c has been used to encode shall be referred to as CV3, CV4, CV5, CV6, CV7 and CV8. Of the 8 column vectors, it shall be assumed that 6 column vectors (column vectors CV1, CV2, CV3, CV5, CV7 and CV8) introduced values that were not encountered previous to their encoding. Consequently, dictionary 106c as illustrated in FIG. 3 has a sort order set for each of the six column vectors that introduced a not-previously-encountered value.

Specifically, between the start and sort order boundary 116, dictionary 106c includes entries for the values from rows 212 of table 100, which are encoded in CV1. From sort order boundary 116 to sort order boundary 302, dictionary 106c includes entries for values from rows 214, encoded for CV2, that were not already encountered in rows 212. From sort order boundary 302 to sort order boundary 304, dictionary 106c includes entries for values from a third set of rows (the rows that correspond to CV3) that were not encountered in any of the already-encoded column vectors. From sort order boundary 304 to sort order boundary 306, dictionary 106c includes entries for values from a fourth set of rows (the rows that correspond to CV5) that were not encountered in any of the already-encoded column vectors. From sort order boundary 306 to sort order boundary 308, dictionary 106c includes entries for values from a fifth set of rows (the rows that correspond to CV7) that were not encountered in any of the already-encoded column vectors. From sort order boundary 308 to the end of dictionary 106c, dictionary 106c includes entries for values from a sixth set of rows (the rows that correspond to CV8) that were not encountered in any of the already-encoded column vectors.

As mentioned above, each value-to-code look-up may require up to N binary searches, where N is the number of sort order sets in the global dictionary. At some point, the delay incurred by performing so many binary searches per value-to-code look-up can become unacceptable. To avoid having to perform an ever-increasing number of binary searches per value-to-code look up, techniques are provided for initiating a new version of the global dictionary upon the number of sort order sets reaching a threshold number. The threshold number may vary from implementation to implementation based, for example, on the configurations of the systems.

Versioned Global Dictionaries

As mentioned above, in response to the number of sort order sets within a global dictionary reaching a pre-determined maximum, the database server ceases to use the existing global dictionary to encode new column vectors, and instead begins a new version of the global dictionary. For example, assume that the maximum is set to 6. Since dictionary 106c already has six sort order sets, using dictionary 106c to encode another column vector that includes values not already present in dictionary 106c would cause another sort order set to be added to dictionary 106c. Instead, a new version of the dictionary (shown in FIG. 4 as dictionary 106d) is created. Dictionary 106d includes entries for all of the values that are in dictionary 106c. However, dictionary 106d includes no sort order boundaries because all entries within dictionary 106d are sorted relative to each other. Consequently, name-to-code look-ups using version 2 of the global dictionary (i.e. dictionary 106d) can be performed in a single binary search.

Clearly, dictionary 106d has different code-to-value mappings than dictionary 106c. Therefore, dictionary 106d cannot be used to decode any of column vectors V1-V8 that have already been encoded using dictionary 106c. To be able to continue to make use of existing encoded column vectors, the database server retains dictionary 106c in memory so long as any column vector that has been encoded using dictionary 106c remains in existence. Under normal circumstances, an encoded column vector remains in memory until discarded or repopulated.

In the example illustrated in FIG. 4, only two versions of the dictionary exist. However, there is no limit to the number of versions a dictionary may have. For example, if the values for a particular column of a table are loaded into fifty column vectors, a first version of the dictionary may reach the maximum number of sort order sets after encoding the first ten column vectors, a second version of the dictionary may reach the maximum number of sort order sets after encoding the next twenty column vectors, and a third version of the dictionary may still be under the maximum number of sort order sets after encoding the final twenty column vectors.

Discarding Unused Versions of a Dictionary

As mentioned above, it is desirable to retain non-current versions of a dictionary in memory so long as any column vector that has been encoded using those versions remains in existence. When any column vector is repopulated, the column vector is rebuilt based on the current values within the rows to which the column vector corresponds. When the rebuilt column vector is compressed, the database server uses the current version of the dictionary to perform the encoding. For example, assume that column vector 104 is repopulated after dictionary 106d (version 2 of the dictionary) has been created. During the repopulation of column vector 104, the current values from rows 212 are used to create the uncompressed version of the column vector, and then dictionary 106d is used to encode/compress the column vector.

As soon as each of the column vectors that rely on a non-current version of a global dictionary has been discarded and/or repopulated, the non-current version of the global directory may be discarded. In the present example, dictionary 106c may be discarded as soon as each of column vectors CV1-CV8 has been discarded or repopulated. To know when each version of a dictionary may be discarded, a "usage-count" maintained for each version of the dictionary. The usage-count of a dictionary version is incremented each time the dictionary is used to encode a column vector, and decremented each time a column vector that was encoded using the dictionary version is either discarded or repopulated.

For example, after dictionary 106c has been used to encode column vectors CV1-CV8, the usage-count for dictionary 106c will be eight. When any of column vectors CV1-CV8 are rebuilt or discarded, the usage-count for dictionary 106c is decremented. Upon the repopulation or discarding of the last of column vectors CV1-CV8, the usage-count for dictionary 106c will be zero, and the database server will discard dictionary 106c.

Prefix Compression

According to one embodiment, the size of dictionaries used to encode column vectors is reduced through the use of prefix compression. Prefix compression avoids the redundant storage of the beginning of values, when consecutively stored values begin the same. Prefix compression is particularly useful for the coding dictionaries described herein because, within each sort order set, the values are sorted. Consequently, there is an increased likelihood that contiguously stored values within the dictionary will have common prefixes. Prefix compression is described, for example, at www.stoimen.com/blog/2012/02/06/computer-algorithms-data-compression-with-prefix-encoding/.

Cross-Node Dictionary Sharing

In the examples given above, multiple column vectors, stored within IMCUs in the volatile memory of a single node, share a common dictionary. However, in alternative embodiments, the IMCUs that share a common dictionary may be spread among multiple nodes in a database cluster. In such embodiments, the each of the nodes maintains a copy of the common dictionary, and keeps its copy of the dictionary in sync with the other nodes through inter-node communications. For example, in response to one node appending an entry to the shared dictionary for a previously unencountered value, the node would send a message to cause all other nodes to append the same entry to their local copies of the shared dictionary.

Such cross-node dictionary sharing may be useful, for example, when performing a cross-node join. For example, assume that a database command calls for a join between c1 and c2, and a column vector with values from c1 is in the volatile memory of a first node, and a column vector with values from c2 is in the volatile memory of a second node. If both column vectors were encoded using the same dictionary, then the join may be performed by comparing the codes from the column vectors, without having to first translate the codes to their corresponding values.

Benefits

As mentioned above, maintaining a local dictionary for each column vector may result in wasted space because, depending on the number of distinct values in the column, the data may be repeated across column vectors. Additionally, the encoded column vector data loses meaning beyond column vector boundaries because it is local dictionary encoded and thus, needs to be decoded to the actual value at each column vector boundary. Further, during the processing of a database query, it is desirable to keep the encoded value as long as possible for performance reasons. A global dictionary across all column vectors alleviates both the problems.

With respect to avoiding wasted space, the global dictionary is always as large as the number of distinct values in the column, so it is more space efficient than keeping a local dictionary on each column vector. With respect to deferring the materialization of column vectors, the column vector data is encoded using global dictionary codes allowing decoding to be delayed to beyond column vector boundaries, resulting in performance improvements in join and aggregate database queries. Thus, employing the techniques described herein may provide one or more of the following benefits:

a. Flexibility to create the global dictionary ("GD") upfront and encode while the data is being loaded into memory or lazily when the data is already laid out as column vectors b. Maintain GD when the column vector data changes due to table inserts, updates, or deletes.

c. Maintain a multi-versioned GD to enable (a) and (b) and provide high concurrency for readers and writers d. Maintain each version of the GD as mostly sorted for quicker logarithmic-time lookup, as opposed to linear time lookup e. Maintain local dictionary for each column vector using GD codes and encode using local codes for even greater space savings f. Allow co-existence of global and local dictionary encoded column vectors g. Maintain various versions of GD to ensure quick encoding and decoding h. Allow persistence of GD versions on-disk for reuse across database instance restarts i. Allow compression of GD itself for further space savings j. Keep auxiliary data structures on top of GD to further speed-up data processing on GD.

Further, with a multi-versioned GD, writers (processes that are encoding and therefore adding entries to the GD) do not to block readers (processes that are decoding) of previous versions of the GD. Also, writers are never blocked by readers.

Further, each higher version of a GD is a superset of the values from the older versions, allowing quick remapping between codes from one version to the other. Sort-orders within each version that allow logarithmic-time lookup for symbols. Each sort-order is a sorted array of symbols allowing use of binary-search. Another property of sort-orders is that the writers append at the tail of the last sort-order allowing the readers on previous sort-orders to not get blocked. Also, writers never get blocked by readers Use of a GD allows faster data loads into memory because of one global dictionary used to encode all column vectors, as opposed to creating a local dictionary for each column vector.

Selective Use of Global Dictionaries

In general, columns that contain a low to medium number of distinct value are more suited to be encoded with a GD. Columns with a very high number of distinct values benefit less. Therefore, according to one embodiment, the database server performs an analysis of column data to determine utility of encoding with GD. Only if the utility is high does the database server proceed to encode with GD. Otherwise, the database server uses local dictionary encoding (e.g. one dictionary per column vector).

Overview of Global Dictionary Creation and Maintentance

Referring to FIG. 5, it is a flowchart depicting an overview of global dictionary creation and maintenance, according to an embodiment. Typically, a global dictionary (GD) is created when a table marked to be in-memory is brought into memory (step 500), and is being laid out in the form of column vectors. Specifically, at step 502, for each column in the table, an analysis phase is done to identify whether the column is a good candidate for encoding with GD or not. Among other statistics, one that the database server may look at is the number of distinct values (NDVs) in the column. If the ratio of NDVs with the total number of rows is below a threshold, then the database server selects the column as a column for which a global dictionary will be used (a "GD" column).

Box 504 encompasses steps performed by the database server for each column that is selected to be a GD column. At step 506, a global dictionary is created for the GD column. Initially, the GD for each GD column will be empty. Box 504 includes steps performed for each column vector of a GD column. Specifically, at step 506, a column vector of the GD column is encoded. For each column vector, the column values are looked up in the GD and the appropriate code is obtained. If the value is not found or if it is the first column vector and no GD is present, then the values are maintained as a delta-set and, at step 516, added to the GD.

As explained above, each delta-set addition introduces a new sort-order in the GD. The number of sort-orders is capped by a system parameter and upon reaching that many sort-orders (tested at step 512), a new GD version is created (step 514) whose first sort-order is a sorted superset of all the sort-orders of the previous version.

As the data is brought into memory, generally the number of new distinct values decrease and we are able to lookup the corresponding GD codes for the repeated values by a binary-search of each sort-order in a particular version. Additionally, each column vector maintains a local dictionary of symbols present in only that column vector and is encoded using the GD codes. The actual column vector values are encoded using local codes, implicitly obtained from the index of GD encoded local symbol dictionary, to keep the code footprint of the real data to a minimum.

Because the GD codes are fixed length, the techniques described herein also obviate the need to keep a symbol lengths array with the local dictionary. In the header of the encoded column vector, the database server keeps the GD version information to quickly know the version to decode the values. If the table data changes due to inserts/updates/deletes, the information is maintained as metadata with each column vector. Whenever the column vector is refreshed for new values, the current version of the GD is used to perform the encoding.

As explained above, if a GD version is no longer referenced by any column vector, then the database server reclaims that space. The space can be reclaimed, for example, by using a background job that periodically checks for such versions. The background job may also be used to achieve all of the following:

Lazy materialization of GD if the column-vectors are loaded in non-GD encoded format Creation and maintenance of auxiliary data structures to assist in data processing on GD Repacking the dictionary by removing unused symbols and codes Hardware Overview According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
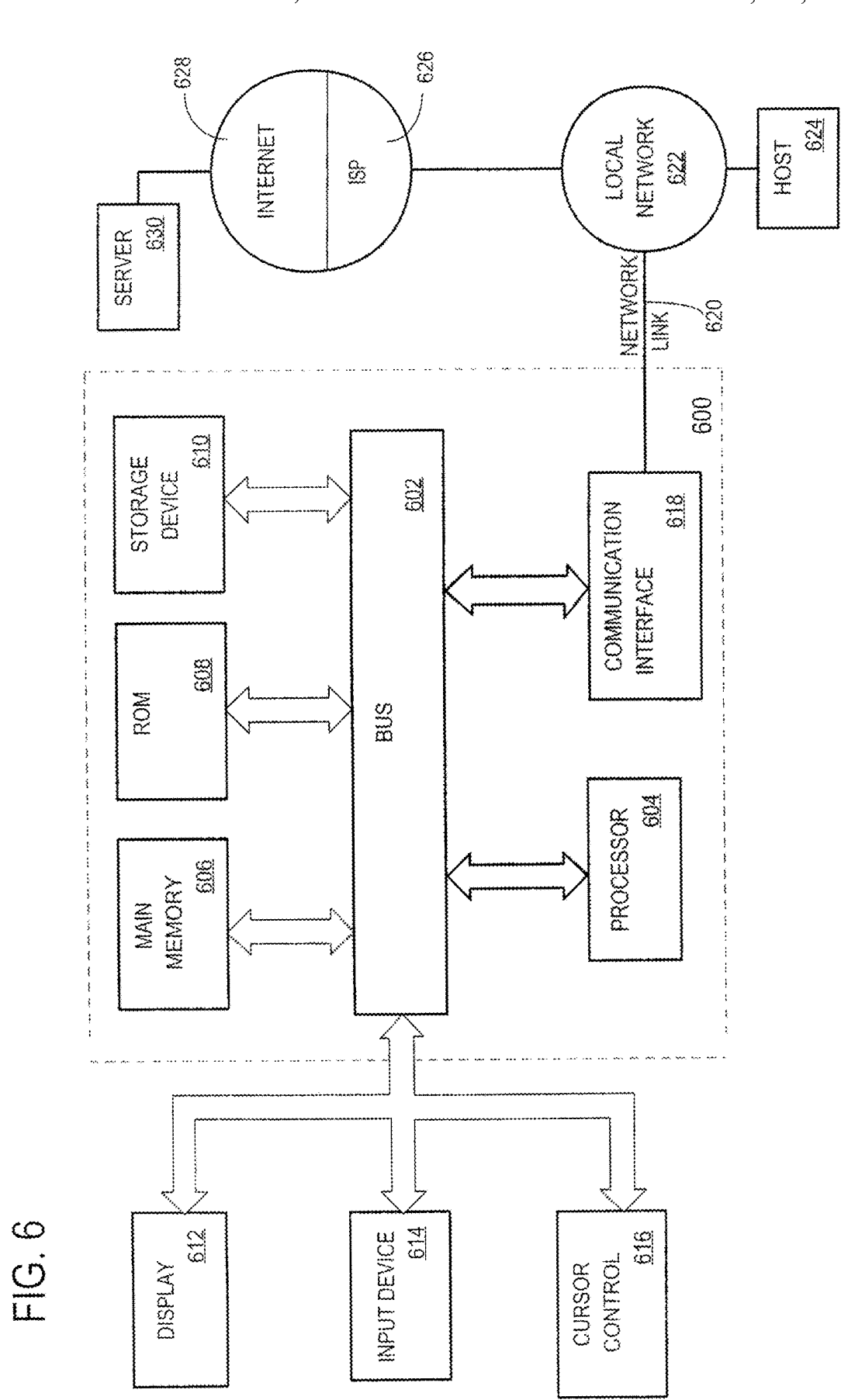
FIG. 6 is a block diagram of a computer system upon which the techniques described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 maintaining a table on persistent storage;
 wherein the table includes a particular column;
 loading values from a first portion of the particular column into a first column vector in a first volatile memory of a first node;
 wherein the first node is a first computing device that comprises the first volatile memory;
 building, in the first volatile memory of the first node, a first copy of a particular dictionary;
 wherein building the first copy of the particular dictionary includes:
  creating a first sorted list of values that includes:
   values from the first portion of the particular column; and
   values, received from a second node via inter-node communication, obtained by the second node from a second portion of the particular column;
  storing entries in the first copy of the particular dictionary, for values in the first sorted list of values, in sort order of the first sorted list of values;
 encoding, by the first node, the first column vector, using the first copy of the particular dictionary, to produce a first encoded column vector;
 loading values from the second portion of the particular column into a second column vector in a second volatile memory of the second node;
 wherein the second node is a second computing device that comprises the second volatile memory;
 wherein the first node is a different computing device than the second node;
 wherein both the first node and the second node have access to the table on persistent storage;
 building, in the second volatile memory of the second node, a second copy of the particular dictionary;
 wherein building the second copy of the particular dictionary includes:
  creating a second sorted list of values that includes:
   values from the second portion of the particular column; and
   values, received from the first node via inter-node communication, obtained by the first node from the first portion of the particular column;
  storing entries in the second copy of the particular dictionary, for values in the second sorted list of values, in sort order of the second sorted list of values;
 wherein the first sorted list of values is identical to the second sorted list of values;
 encoding, by the second node, the second column vector, using the second copy of the particular dictionary, to produce a second encoded column vector.

2. The method of claim 1 further comprising:
 analyzing the particular column to determine whether a global dictionary should be used to encode column vectors for the particular column; and
 wherein the step of encoding the second column vector using the particular dictionary is performed in response to determining that a global dictionary should be used to encode column vectors for the particular column.

3. A method comprising:
 maintaining a table on persistent storage;
 wherein the table includes a particular column;
 loading values from a first portion of the particular column into a first column vector in a first volatile memory of a first computing device;
 building a particular dictionary based on values in the first column vector;
 wherein building the particular dictionary includes:
  obtaining, from the first column vector, a first set of values that are not already in the particular dictionary;
  creating a second set of values by sorting the first set of values based on a particular sorting criterion and removing duplicates from the first set of values;
  storing a first ordered set of entries in the particular dictionary;
  wherein the first ordered set of entries includes a single entry for each distinct value in the second set of values;
  wherein, within the particular dictionary, order of the first ordered set of entries reflects order of the second set of values;
 encoding the first column vector, using the particular dictionary, to produce a first encoded column vector; and
 loading values from a second portion of the particular column into a second column vector,
 storing the second column vector in one of:
  the first volatile memory of the first computing device; or
  a second volatile memory of a second computing device;
 adding entries to the particular dictionary based values in the second column vector;
 wherein adding entries to the particular dictionary includes:
  obtaining, from the second column vector, a third set of values that are not already in the particular dictionary;

creating a fourth set of values by sorting the third set of values based on the particular sorting criterion and removing duplicates from the third set of values;
storing a second ordered set of entries in the particular dictionary;
wherein the second ordered set of entries includes a single entry for each distinct value in the fourth set of values;
wherein, within the particular dictionary, order of the second ordered set of entries reflects order of the fourth set of values;
encoding the second column vector, using the particular dictionary, to produce a second encoded column vector; wherein:
within the table, the first portion of the particular column and the second portion of the particular column have a particular value in common;
the particular dictionary maps the particular value to a single unique code;
the first ordered set of entries constitute a first sort order set, wherein the first order set includes a single entry for each distinct value from the first portion of the particular column;
after the first sort order set and before a second order set, the particular dictionary includes a sort order boundary;
wherein the second ordered set of entries constitute the second order set, which includes a single entry for each distinct value that:
is in the second portion of the particular column; and
is not in the first portion of the particular column;
wherein the only entry, within the particular dictionary, for the particular value is within the first order set.

4. The method of claim 3 further comprising performing a value-to-code look-up by performing a first binary search on the first sort order set and a second binary search on the second sort order set.

5. The method of claim 3 wherein:
a first version of the particular dictionary is used to encode the first and second encoded column vectors; and
the method further comprises:
in response to detecting that the first version of the particular dictionary includes a maximum number of sort order sets, creating a second version of the particular dictionary that includes entries for all values from the first version of the particular dictionary;
loading values from a third portion of the particular column into a third column vector in volatile memory; and
encoding the third column vector, using the second version of the particular dictionary, to produce a third encoded column vector.

6. The method of claim 5 further comprising, after producing the first encoded column vector, rebuilding the first encoded column vector by:
loading values from the first portion of the particular column into a new first column vector in volatile memory; and
encoding the new first column vector, using the second version of the particular dictionary, to produce a new first encoded column vector.

7. The method of claim 5 further comprising:
maintaining a first usage-count for the first version of the particular dictionary;
incrementing the first usage-count in response to encoding the first column vector using the first version of the particular dictionary;
incrementing the first usage-count in response to encoding the second column vector using the first version of the particular dictionary; and
decrementing the first usage-count when any encoded column vector that was encoded using the first version of the particular dictionary is discarded or rebuilt.

8. The method of claim 7 further comprising discarding the first version of the particular dictionary when the first usage-count reaches zero.

9. One or more non-transitory computer-readable media, storing instructions which, when executed by one or more processors, cause:
maintaining a table on persistent storage;
wherein the table includes a particular column;
loading values from a first portion of the particular column into a first column vector in a first volatile memory of a first node;
wherein the first node is a first computing device that comprises the first volatile memory;
building, in the first volatile memory of the first node, a first copy of a particular dictionary;
wherein building the first copy of the particular dictionary includes:
creating a first sorted list of values that includes:
values from the first portion of the particular column; and
values, received from a second node via inter-node communication, obtained by the second node from a second portion of the particular column;
storing entries in the first copy of the particular dictionary, for values in the first sorted list of values, in sort order of the first sorted list of values;
encoding, by the first node, the first column vector, using the first copy of the particular dictionary, to produce a first encoded column vector;
loading values from the second portion of the particular column into a second column vector in a second volatile memory of the second node;
wherein the second node is a second computing device that comprises the second volatile memory;
wherein the first node is a different computing device than the second node;
wherein both the first node and the second node have access to the table on persistent storage;
building, in the second volatile memory of the second node, a second copy of the Particular dictionary;
wherein building the second copy of the particular dictionary includes:
creating a second sorted list of values that includes:
values from the second portion of the particular column; and
values, received from the first node via inter-node communication, obtained by the first node from the first portion of the particular column;
storing entries in the second copy of the particular dictionary, for values in the second sorted list of values, in sort order of the second sorted list of values;
wherein the first sorted list of values is identical to the second sorted list of values;
encoding, by the second node, the second column vector, using the second copy of the particular dictionary, to produce a second encoded column vector.

10. The one or more non-transitory computer-readable media, storing instructions which, when executed by one or more processors, cause:
    maintaining a table on persistent storage;
    wherein the table includes a particular column;
    loading values from a first portion of the particular column into a first column vector in a first volatile memory of a first computing device;
    building a particular dictionary based on values in the first column vector;
    wherein building the particular dictionary includes:
        obtaining, from the first column vector, a first set of values that are not already in the particular dictionary;
        creating a second set of values by sorting the first set of values based on a particular sorting criterion and removing duplicates from the first set of values;
        storing a first ordered set of entries in the particular dictionary;
        wherein the first ordered set of entries includes a single entry for each distinct value in the second set of values;
        wherein, within the particular dictionary, order of the first ordered set of entries reflects order of the second set of values;
    encoding the first column vector, using the particular dictionary, to produce a first encoded column vector; and
    loading values from a second portion of the particular column into a second column vector;
    storing the second column vector in one of:
        the first volatile memory of the first computing device; or
        a second volatile memory of a second computing device;
    adding entries to the particular dictionary based values in the second column vector;
    wherein adding entries to the particular dictionary includes:
        obtaining, from the second column vector, a third set of values that are not already in the particular dictionary;
        creating a fourth set of values by sorting the third set of values based on the particular sorting criterion and removing duplicates from the third set of values;
        storing a second ordered set of entries in the particular dictionary;
        wherein the second ordered set of entries includes a single entry for each distinct value in the fourth set of values;
        wherein, within the particular dictionary, order of the second ordered set of entries reflects order of the fourth set of values;
    encoding the second column vector, using the particular dictionary, to produce a second encoded column vector;
    wherein:
        within the table, the first portion of the particular column and the second portion of the particular column have a particular value in common;
        the particular dictionary maps the particular value to a single unique code;
        the first ordered set of entries constitute a first sort order set, wherein the first order set includes a single entry for each distinct value from the first portion of the particular column;
        after the first sort order set and before a second order set, the particular dictionary includes a sort order boundary;
        wherein the second ordered set of entries constitute the second order set, which includes a single entry for each distinct value that:
            is in the second portion of the particular column; and
            is not in the first portion of the particular column;
        wherein the only entry, within the particular dictionary, for the particular value is within the first order set.

11. The one or more non-transitory computer-readable media of claim 10 wherein the instructions include instructions for performing a value-to-code look-up by performing a first binary search on the first sort order set and a second binary search on the second sort order set.

12. The one or more non-transitory computer-readable media of claim 10 wherein:
    a first version of the particular dictionary is used to encode the first and second encoded column vectors; and
    the one or more non-transitory computer-readable media store instructions for:
        in response to detecting that the first version of the particular dictionary includes a maximum number of sort order sets, creating a second version of the particular dictionary that includes entries for all values from the first version of the particular dictionary;
        loading values from a third portion of the particular column into a third column vector in volatile memory; and
        encoding the third column vector, using the second version of the particular dictionary, to produce a third encoded column vector.

13. The one or more non-transitory computer-readable media of claim 12 further storing instructions for:
    maintaining a first usage-count for the first version of the particular dictionary;
    incrementing the first usage-count in response to encoding the first column vector using the first version of the particular dictionary;
    incrementing the first usage-count in response to encoding the second column vector using the first version of the particular dictionary; and
    decrementing the first usage-count when any encoded column vector that was encoded using the first version of the particular dictionary is discarded or rebuilt.

14. The one or more non-transitory computer-readable media of claim 13 further storing instructions for discarding the first version of the particular dictionary when the first usage-count reaches zero.

15. The one or more non-transitory computer-readable media of claim 12 further storing instructions for, after producing the first encoded column vector, rebuilding the first encoded column vector by:
    loading values from the first portion of the particular column into a new first column vector in volatile memory; and
    encoding the new first column vector, using the second version of the particular dictionary, to produce a new first encoded column vector.

* * * * *

UNITED STATES PATENT AND TRADEMARK OFFICE
CERTIFICATE OF CORRECTION

PATENT NO. : 10,726,016 B2
APPLICATION NO. : 15/294460
DATED : July 28, 2020
INVENTOR(S) : Chavan et al.

It is certified that error appears in the above-identified patent and that said Letters Patent is hereby corrected as shown below:

In the Drawings

On sheet 5 of 6, in FIG. 5, under Reference Numeral 510, Line 1, delete "USINGGD" and insert -- USING GD --, therefor.

In the Specification

In Column 11, Line 15, delete "vectors" and insert -- vectors. --, therefor.

In Column 11, Line 20, delete "writers" and insert -- writers. --, therefor.

In Column 11, Line 23, delete "lookup" and insert -- lookup. --, therefor.

In Column 11, Line 26, delete "savings" and insert -- savings. --, therefor.

In Column 11, Line 28, delete "vectors" and insert -- vectors. --, therefor.

In Column 11, Line 30, delete "decoding" and insert -- decoding. --, therefor.

In Column 11, Line 32, delete "restarts" and insert -- restarts. --, therefor.

In Column 11, Line 34, delete "savings" and insert -- savings. --, therefor.

In Column 11, Line 51, delete "readers" and insert -- readers. --, therefor.

In Column 12, Line 2, delete "Maintentance" and insert -- Maintenance --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

In the Claims

In Column 16, Line 55, in Claim 3, delete "vector," and insert -- vector; --, therefor.

In Column 18, Line 50, in Claim 9, delete "Particular" and insert -- particular --, therefor.